United States Patent
Sharma

(10) Patent No.: US 7,798,658 B2
(45) Date of Patent: Sep. 21, 2010

(54) A/C SYSTEM SIDE VIEW MIRROR AND SIDE GLASS DE-ICER

(75) Inventor: Rajeev Sharma, Troy, MI (US)

(73) Assignee: DENSO International America, Inc., Southfield, MI (US)

( * ) Notice: Subject to any disclaimer, the term of this patent is extended or adjusted under 35 U.S.C. 154(b) by 0 days.

(21) Appl. No.: 12/368,528

(22) Filed: Feb. 10, 2009

(65) Prior Publication Data

US 2010/0202052 A1 Aug. 12, 2010

(51) Int. Cl.
- *G02B 7/182* (2006.01)
- *B60R 1/06* (2006.01)
- *B60S 1/54* (2006.01)

(52) U.S. Cl. .............. 359/507; 359/512; 454/123; 454/124; 15/313

(58) Field of Classification Search .......... 359/507, 359/509, 512; 454/123, 124; 15/313
See application file for complete search history.

(56) References Cited

U.S. PATENT DOCUMENTS

| | | | | |
|---|---|---|---|---|
| 3,522,584 A | * | 8/1970 | Talbot | 362/494 |
| 3,596,710 A | * | 8/1971 | Neal | 165/41 |
| 3,612,647 A | * | 10/1971 | Laprairie | 359/507 |
| 3,859,899 A | * | 1/1975 | Mills | 454/164 |
| 3,877,780 A | * | 4/1975 | Taylor | 359/509 |
| 4,283,117 A | | 8/1981 | Ellis | |
| 4,350,084 A | * | 9/1982 | Azzola | 454/151 |
| 4,439,013 A | * | 3/1984 | Hagn et al. | 359/509 |
| 4,462,303 A | * | 7/1984 | Gebhard | 454/164 |
| 4,697,065 A | * | 9/1987 | Ishitsubo et al. | 219/219 |
| 4,903,581 A | | 2/1990 | Nilsson | |
| 4,981,072 A | | 1/1991 | Hanson et al. | |
| 5,140,719 A | * | 8/1992 | Cowan | 15/313 |
| 5,903,389 A | * | 5/1999 | Rumez et al. | 359/509 |
| 6,100,500 A | | 8/2000 | Jefferson, Jr. et al. | |
| 6,267,664 B1 | * | 7/2001 | Vandale et al. | 454/123 |
| 6,290,361 B1 | | 9/2001 | Berzin | |
| 2004/0142232 A1 | * | 7/2004 | Risca et al. | 429/100 |

FOREIGN PATENT DOCUMENTS

DE 3002134 A1 * 7/1981

* cited by examiner

*Primary Examiner*—Ricky D Shafer
(74) *Attorney, Agent, or Firm*—Harness, Dickey & Pierce, PLC

(57) ABSTRACT

A vehicle heating system employs a vehicle rearview mirror outer case that defines a cavity within which a mirror resides. A vehicle rearview mirror inner case may define a cavity and the rearview mirror inner case may reside within the rearview mirror outer case. A mirror surface or mirror structure, such as glass or plastic, may reside against the rearview mirror inner case to enclose the inner case, with the exception of air inlet and outlet tubes. A rearview mirror inlet tube may pass through the outer case and the inner case and permit air to enter the rearview mirror inner case. A rearview mirror outlet tube that passes through the outer case and the inner case may permit air to exit the rearview mirror inner case. An HVAC unit attaches to the rearview mirror inlet tube to blow air into the rearview mirror outer case or inner case.

16 Claims, 6 Drawing Sheets

A/C SYSTEM SIDE VIEW MIRROR AND SIDE GLASS DE-ICER

FIELD

The present disclosure relates to an air-conditioning system that is capable of de-icing a side view mirror and a side glass.

BACKGROUND

This section provides background information, which is not necessarily prior art, that is related to the present disclosure. Modern vehicles, such as automobiles, may utilize resistance type electrical heating devices to warm specific surfaces, such as mirrored surfaces, to prevent such mirrored surfaces from accumulating moisture, such as water droplets, ice, and/or snow. One such mirrored surface of a vehicle that may be electrically heated is an exterior side-mounted, rear view mirror. A side-mounted, rear view mirror may be used to view an area on either side of a vehicle, from the location of the side mirror toward the rear and side areas of the vehicle. While such resistance-type electrically heated mirrors have been satisfactory for their given purposes, they are not without undesirable limitations. One such limitation is the amount of electricity that is consumed by resistance-type electrical heaters that places an electrical burden on an on-board battery and/or an on-board alternator. Another limitation is the additional wiring, circuit breakers and associated costs with such necessary components and their installation. What is needed then is a device that does not suffer from the above limitations.

SUMMARY

This section provides a general summary of the disclosure, and is not a comprehensive disclosure of its full scope or all of its features. A heating system for a vehicle may employ a vehicle rearview mirror outer case that defines a cavity within which a mirror resides. A vehicle rearview mirror inner case may define a cavity and the rearview mirror inner case may reside within the rearview mirror outer case. A mirror surface or mirror structure, such as glass or plastic, may reside against the rearview mirror inner case to enclose the inner case, with the exception of air inlet and outlet tubes. A rearview mirror inlet tube may pass through the outer case and the inner case and permit air to enter the rearview mirror inner case. A rearview mirror outlet tube may pass through the outer case and the inner case and permits air to exit the rearview mirror inner case.

The heating system may further employ an HVAC unit, which may attach to the rearview mirror inlet tube, to blow air into the rearview mirror outer case or inner case. An electric motor within the rearview mirror outer case may be employed to move the mirror surface to different positions for viewing by a passenger or vehicle operator. A partition in the cavity of the rearview mirror inner case to route the forced air along a rear surface of the mirrored portion. The partition lies longitudinally between the rearview mirror inlet tube and the rearview mirror outlet tube, so as not to cross the paths of either of the tubes, in a projected longitudinal state, as depicted in the cross-section of FIGS. 4A and 4B.

A membrane may be located between the mirror surface and the rearview mirror outer case. A vehicle door may define an air distributor and a vehicle door window such that the air distributor distributes air across an interior surface of the door window. The rearview mirror outlet tube passes into or feeds air into the air distributor.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate like or corresponding parts throughout the several views of the drawings.

DETAILED DESCRIPTION

Figure 1:
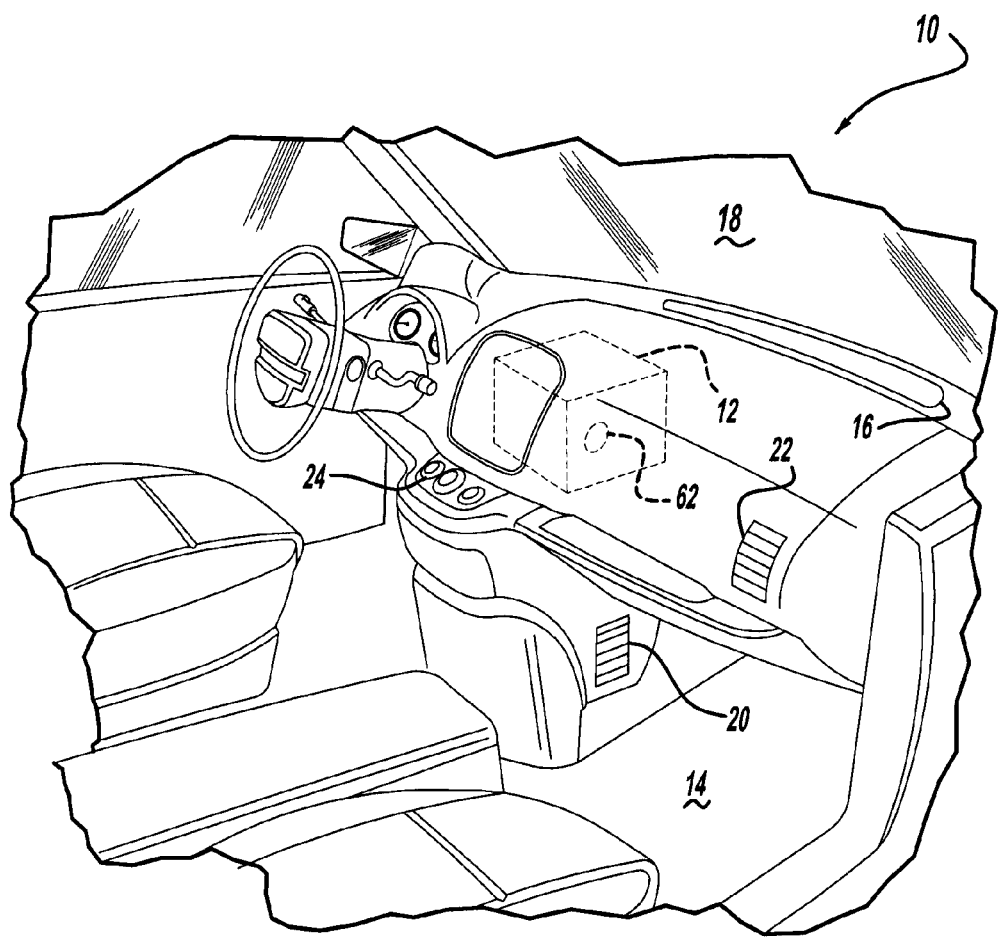
FIG. 1 is a perspective view of a vehicle depicting a general location of an HVAC module and a driver's side, rear view mirror.

The teachings of the present disclosure, described herein using FIGS. 1-6 for illustrative purposes, reflect embodiments but not all possible implementations, and are not intended to limit the scope of the present disclosure. Turning first to FIG. 1, a vehicle 10 depicts a heating, ventilation and air conditioning unit 12 ("HVAC unit") located behind an interior dash, next to a firewall of the vehicle 10. The HVAC unit 12, as is known in the art, may contain various electric motors coupled to internal doors to facilitate the direction of air forced through the HVAC unit 12 by a blower en route to specific locations within the interior cabin 14 of the vehicle 10. More specifically, doors within the HVAC unit 12 may be adjusted to direct warmed, cooled, or air of a specific moisture and/or temperature through a front windshield opening 16 and onto the interior surface of the front windshield 18 or the doors may be adjusted to direct the same conditions of air from a foot vent 20 and onto the feet and lower extremities of a passenger. Similarly, such air may be directed through a face vent 22 and onto the faces, upper extremities and torso portions of passengers. HVAC controls 24 may be used to control the temperature, humidity, speed and direction of the air blown from vents or openings 16, 20, 22.

Figure 2:
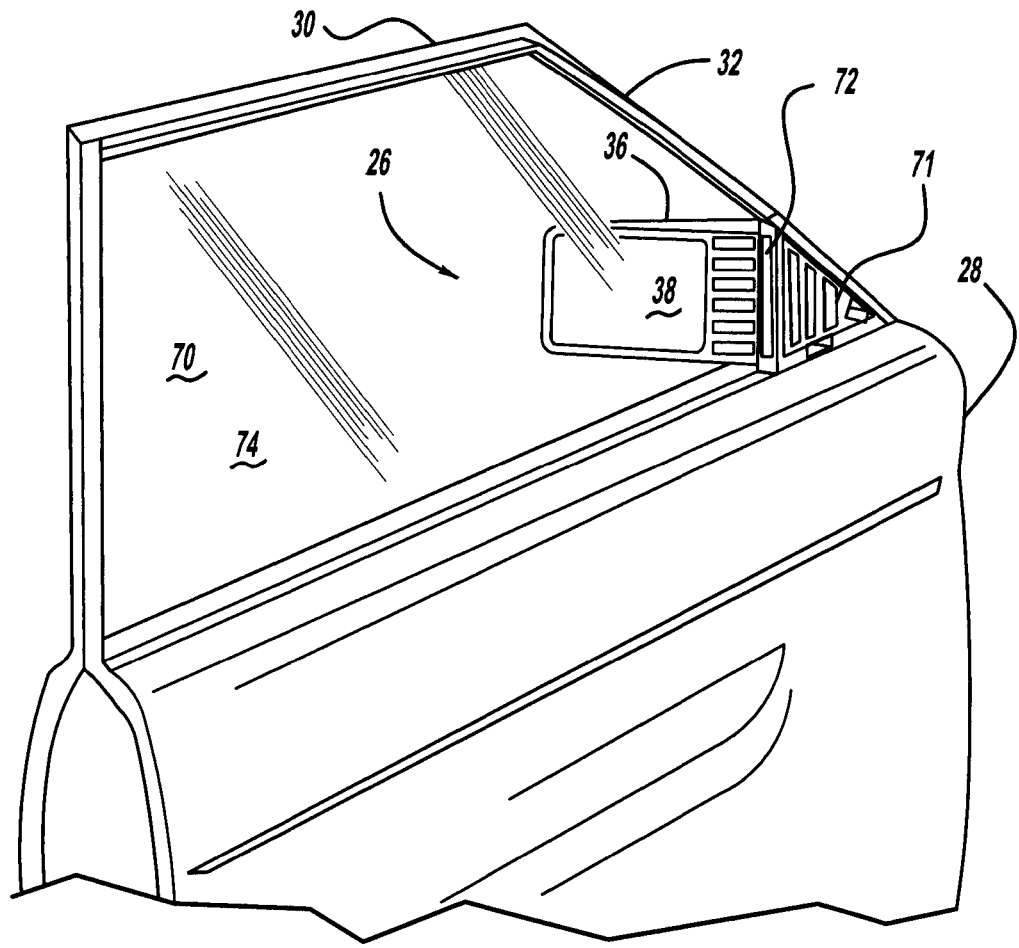
FIG. 2 is a perspective view of a driver side door and a driver side, rear view mirror.
Figure 3:
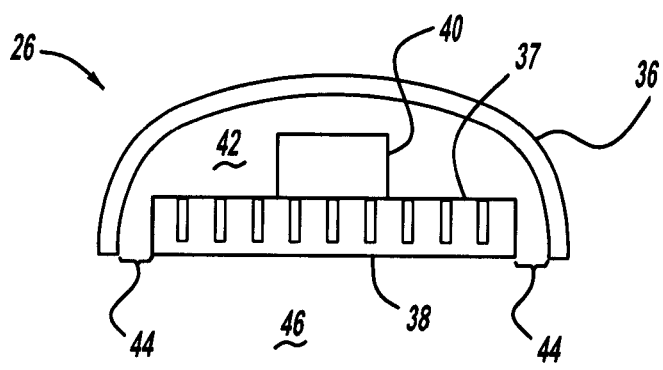
FIG. 3 is a general top, internal view of a driver side, rear view mirror according to an embodiment of the present teachings.

Turning now to FIGS. 2 and 3, general details of the present disclosure will be presented. A driver side, rear view mirror 26 may be attached to the driver side door 28, such as to a door window frame 30 or more specifically, relative to level ground, a slanted portion 32 of the door window frame 30 and a horizontal or level portion 34 of the door 28. The driver side, rear view mirror 26 may be attached with a variety of structures, such as with nuts and bolts or with some sort of biasing or spring clips to snap the mirror 26 securely into position.

The mirror 26 may have an outer casing 36, and a mirror structure or mirror surface 38 that is movable by an electric motor 40. An air gap 42 or space 42 may exist between the casing 36 and the mirror structure 38. Between the mirror structure 38 and each side of the case 36, a flexible membrane 44 may exist to permit the mirror to move within the casing 36 yet maintain an airtight separation between the gap 42 or space 42 and the outside air 46 or environment 46.

Figure 4A:
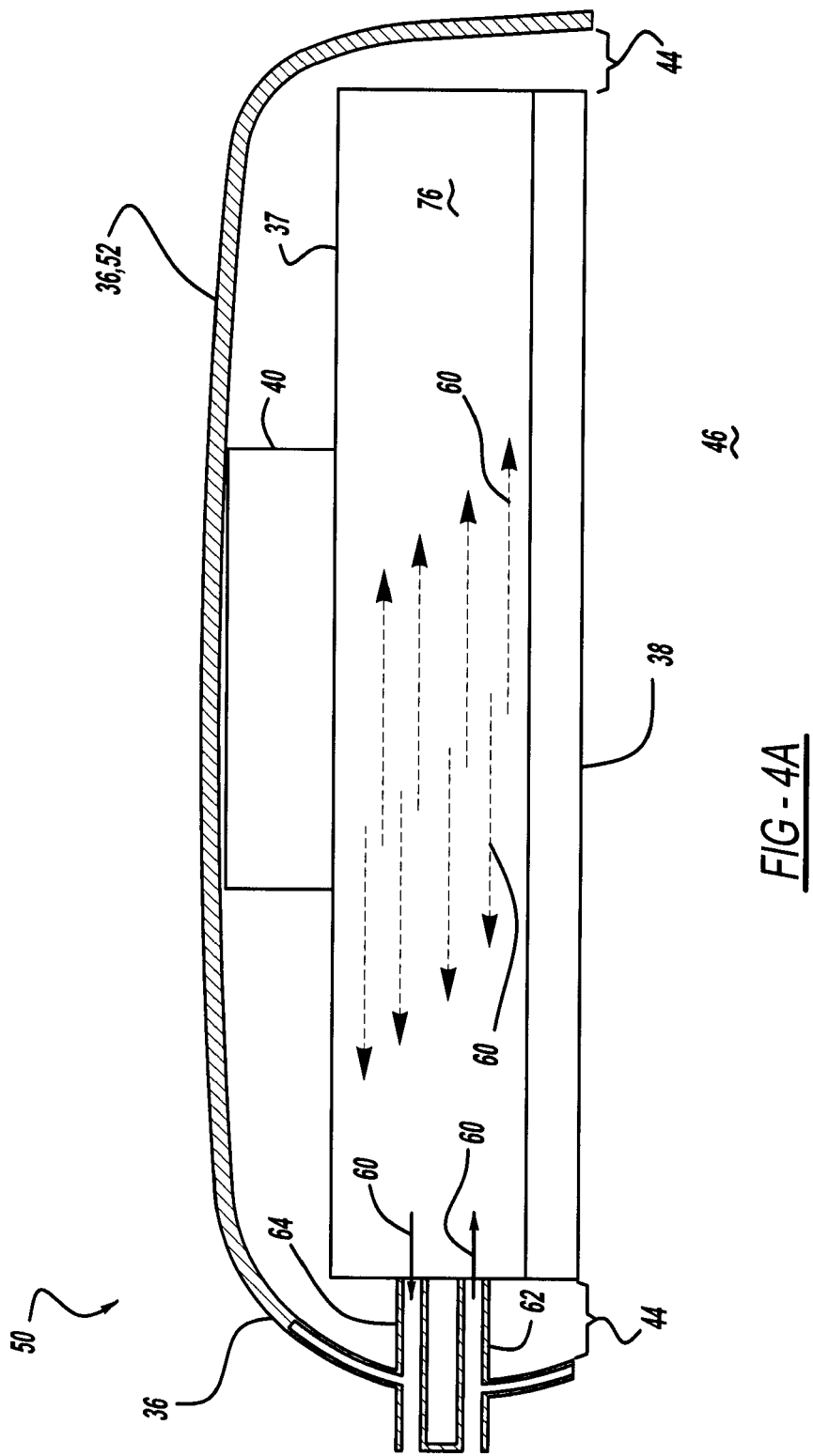
FIG. 4A is a top, cross-sectional view of a passenger side, rear view mirror according to an embodiment of the present teachings.
Figure 6:
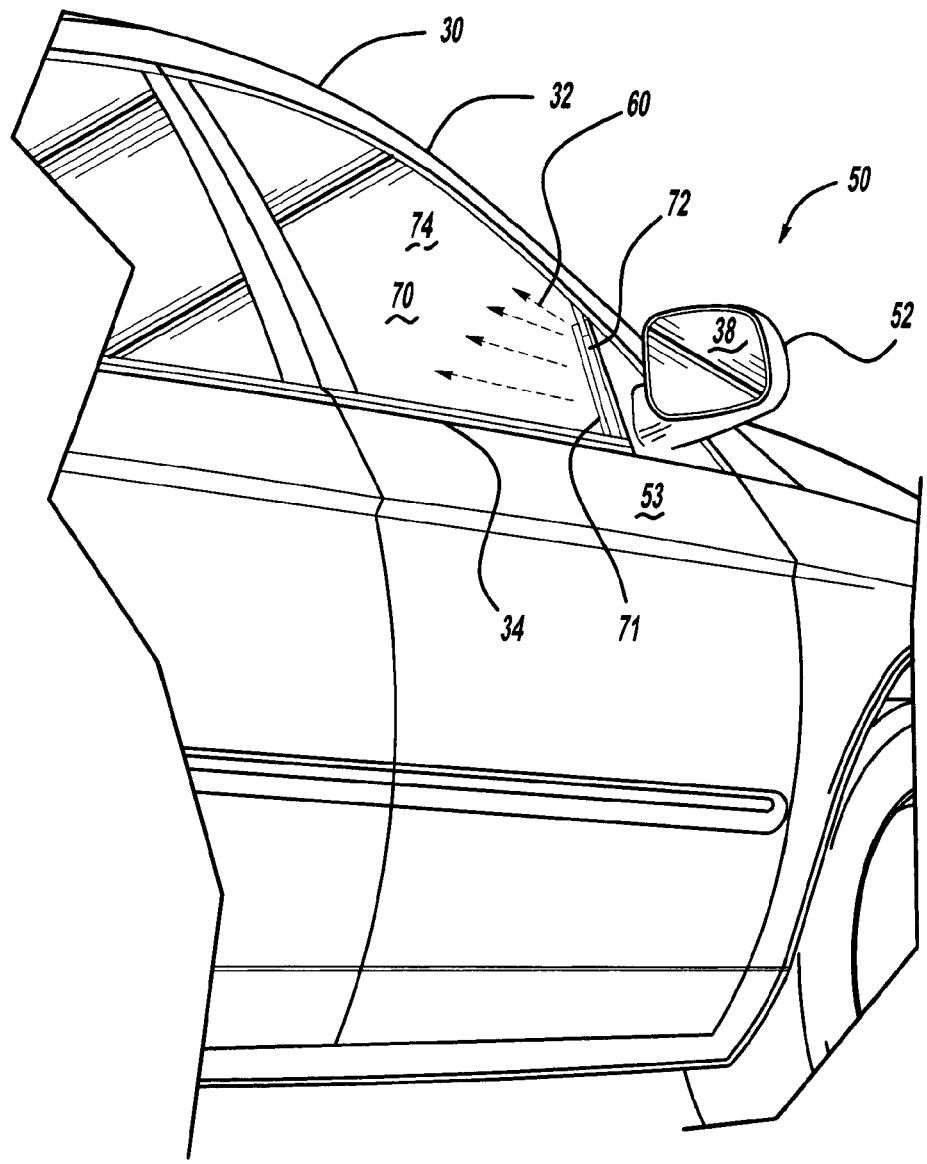
FIG. 6 is a perspective exterior view of a passenger side, rear view mirror.

Turning now to FIG. 4A and FIG. 6, another embodiment of the current disclosure will be described. A passenger side, rear view mirror 50 may be attached to the passenger side door 53, such as to a door window frame or more specifically, relative to level ground, a slanted portion 32 of the door window frame 30 and a horizontal or level portion 34 of the door 53. The passenger side, rear view mirror 50 may be attached with a variety of structures, such as nuts and bolts, welding, or using some sort of biasing clips to snap the mirror 26 securely into position. The mirror 50 may have an outer casing 36, and a reflective or mirror structure 38 with a depth that is movable by an electric motor 40. An air gap 42 or space 42 may exist between the casing 36 and the mirror surface 38. Between the mirror surface 38 and each side of the case 36, a flexible membrane 44 may exist to permit the mirror to move within the casing 36 yet maintain an air tight separation between the gap 42 or space 42 and the outside air 46 or environment 46.

Continuing with reference to FIG. 4A, the HVAC unit 12 may provide forced air 60 to an air inlet tube 62 so that air may pass into a cavity 76 or space 76 behind the mirror surface 38. Upon the forced air 60 entering the cavity 76, the air is free to mix with air that is in the space 76, and then exit from the cavity 76 through an air outlet tube 64. Upon exiting the air outlet tube 64, the air 60 may then be blown against an interior surface 74 of the passenger window 70 (FIG. 6).

Figure 4B:
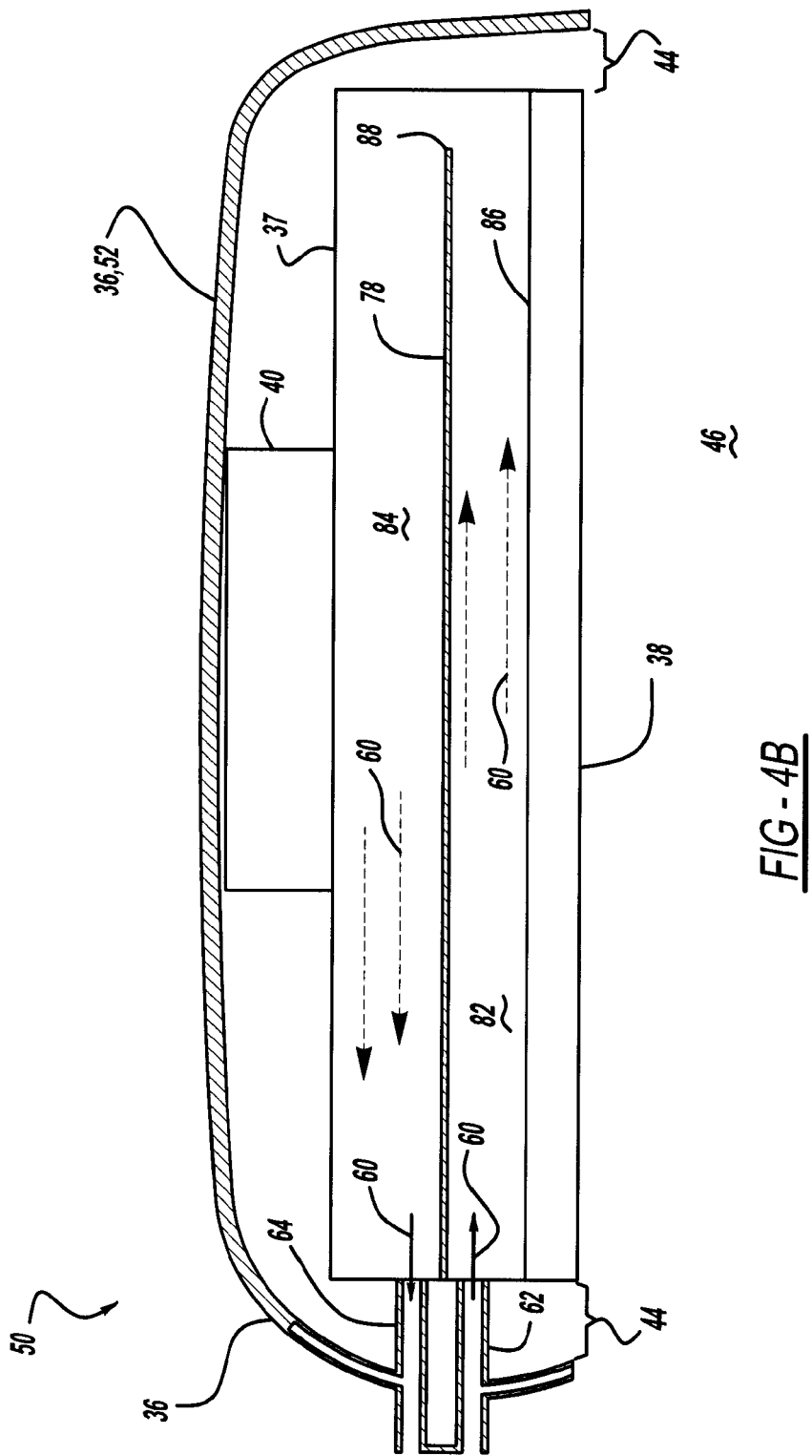
FIG. 4B is a top, cross-sectional view of a passenger side, rear view mirror according to an embodiment of the present teachings.

Turning now to FIG. 4B, another embodiment will be described. The embodiment depicted in FIG. 4B is functionally the same as that depicted in FIG. 4A, with the exception of the partition 78 that divides the cavity 76 of the embodiment depicted in FIG. 4A. Regarding FIG. 4B, the partition 78 is a structure or division that results in a front cavity 82 and a rear cavity 84. As depicted, forced air 60 from the HVAC unit 12 may enter the front cavity 82 through the mirror inlet tube 62 and flow across the rear surface 86 of the glass or plastic structure that has a mirrored surface 38. Upon the forced air 60 passing across and contacting the mirrored surface 38, the air 60 moves around the partition end 88 to a second side of the partition 78. As depicted in FIG. 4B, the forced air 60 then again travels the length of the partition 78 and into the mirror outlet tube 64. Upon the forced air exiting the mirror outlet tube 64, the air 60 may enter into a chamber or air distributor 71 next to the passenger side window 70 with the air 60 then being sprayed or distributed across the interior surface 74 of the passenger side window 70 to defog and heat the glass. The air 60 may heat both the interior and exterior of the glass.

Figure 5:
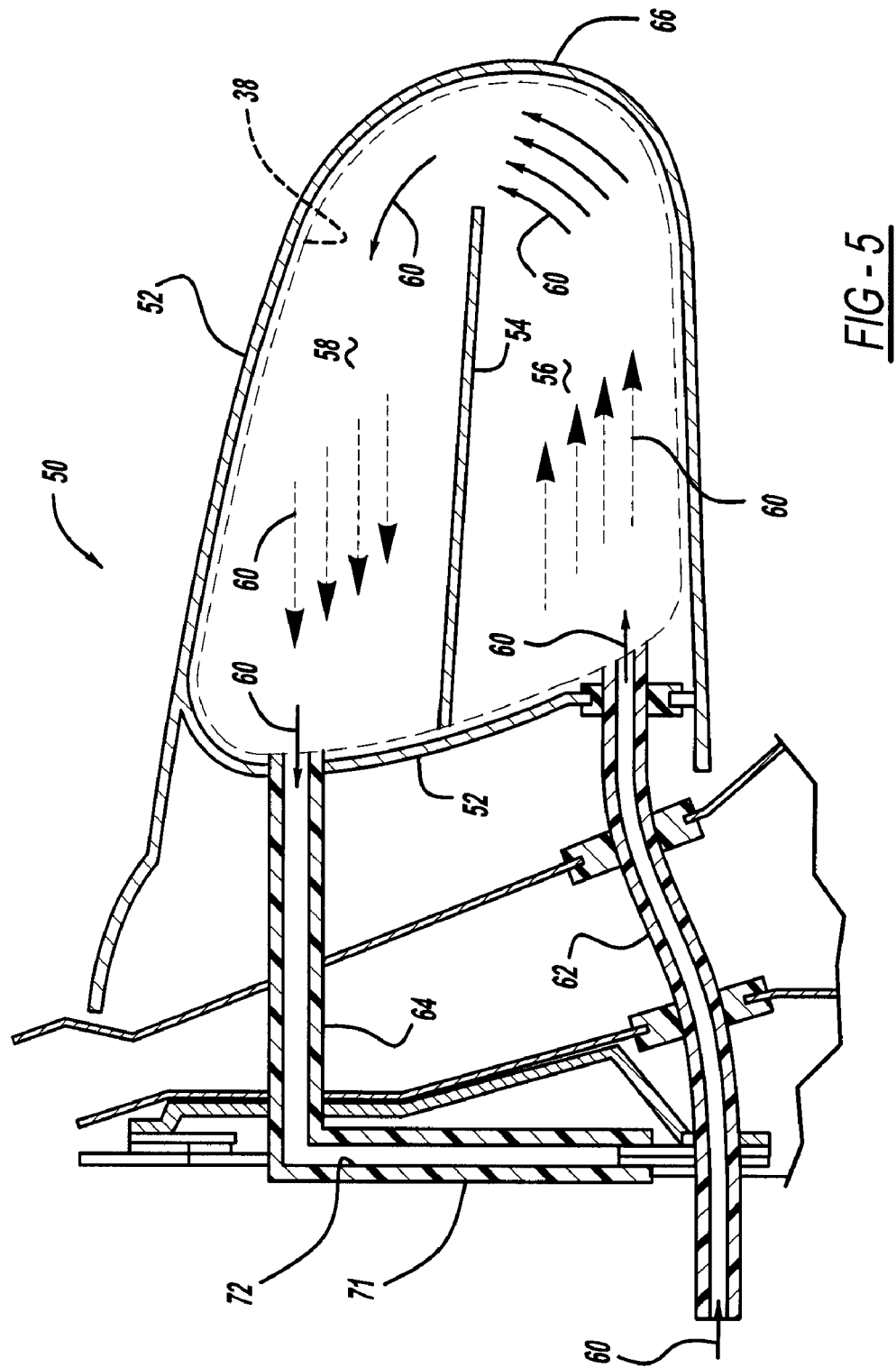
FIG. 5 is a cross-sectional view of a passenger side, rear view mirror according to an embodiment of the present teachings.

Turning now to FIGS. 5 and 6, further details of the present disclosure will be explained using a passenger side mirror. FIG. 5 depicts a passenger side, rear view mirror 50 that is in fluid communication with the HVAC unit 12 of the vehicle 10. More specifically, the passenger side, rear view mirror 50 may be attached to the exterior of a passenger side door 53. Additionally, the mirror 50 may employ a case 52 or casing to protect or shield a mirror surface 38 of a mirror from exterior elements. As depicted in the cross-sectional view of FIG. 5, the mirror may be divided into two general interior chambers separated by an interior partition 54. More specifically, the case 52 may be divided into a lower or bottom chamber 56 and an upper or top chamber 58. The chambers 56, 58, divided by the partition 54, contain airflow 60 that passes through the passenger side, rear view mirror 50. In operation, air 60 in the HVAC unit 12 may be directed to one or both of the side rear view mirrors 26, 50. Using the passenger side, rear view mirror 50 as an example, the air 60 from the HVAC unit 12 passes to a mirror air inlet tube 62, which may pass through the vehicle door 53 and into a bottom or lower chamber 56 of the mirror casing 52. The air exits the mirror inlet tube 62 and enters the bottom chamber 56 passing between the casing 52 and the partition 54. The air 60, being forced by a blower in the HVAC unit 12, may pass across an entire lower or bottom side interior surface of the mirror casing 52 before reaching the end 66 of the mirror casing 52. The end of the mirror casing 52 is that portion of the mirror farthest from the vehicle 10. At the end of the mirror casing 52, the air 60 flows around the partition 54 and into a top or upper chamber 58 of the mirror casing 52. After flowing across or through the upper chamber 58, the air 60 passes into a mirror outlet tube 64. The air 60 then passes into an air distributor 71 beside the side window 70. The air distributor 71 may have an outlet 72 on an interior of the vehicle beside the interior surface 74 of the side window 70 to permit the air 60 to exit the outlet 72 and pass over the interior surface 74 of the side window 70, as depicted in FIG. 6, to heat and defog the interior and exterior window surfaces.

The teachings may also disclose a heating system for a vehicle 10 that employs a vehicle rearview mirror outer case that defines a cavity within which a mirror resides. A vehicle rearview mirror inner case 37 may define a cavity 76 and the rearview mirror inner case 37 may reside within the rearview mirror outer case 36. A mirror surface 38 or mirror portion, such as glass or plastic, may reside against the rearview mirror inner case 37. A rearview mirror inlet tube 62 may pass through the outer case 36 and the inner case 37 and permit air to enter the rearview mirror inner case 37. A rearview mirror outlet tube that passes through the outer case 36 and the inner case 37 and permits air to exit the rearview mirror inner case 37. The heating system may further employ an HVAC unit 12, to which the rearview mirror inlet tube 62 may be attached, to blow air 60 into the rearview mirror outer case 36 or inner case 37. An electric motor 40 within the rearview mirror outer case 36 may be employed to move the mirror surface 38 to different positions for viewing by a passenger or vehicle operator. A partition 78 in the cavity of the rearview mirror inner case 37 to route the forced air 60 along a rear surface of the mirrored portion. The partition 78 lies longitudinally between the rearview mirror inlet tube 62 and the rearview mirror outlet tube 64, so as not to cross the paths of either of the tubes 62, 64 in a projected longitudinal state, as depicted in the cross-section of FIGS. 4A and 4B.

A membrane 44 may be located between the mirror surface 38 and the rearview mirror outer case 36. A vehicle door 53 may define an air distributor 71 and a vehicle door window 70 such that the air distributor 71 distributes air across an interior surface 74 of the door window 70. The rearview mirror outlet tube 64 passes into or feeds air into the air distributor 71.

With reference primarily to FIG. 5, a heating system for a vehicle may employ a vehicle rearview mirror outer case 52 defining a cavity within which a mirror 38 resides. A vehicle rearview mirror inner case, such as the inner case 37 depicted in FIG. 4A, may define a cavity or hollow portion or volume for airflow. The rearview mirror inner case 37 may partially or completely reside within the rearview mirror outer case 52. A mirror surface 38 may reside against the rearview mirror inner case 37. A rearview mirror inlet tube 62 that passes through the outer case 52 and the inner case 37 and permits air to enter the rearview mirror inner case 37. A rearview mirror outlet tube 64 passes through the outer case 52 and the inner case 37 and permits air to exit the rearview mirror inner case 37. A vehicle door window 70 and a vehicle door 53 define an air distributor 71 to distribute air from the rearview mirror outlet tube 64 across an interior surface 74 of the door window 70. The heating system may further employ an HVAC unit 12, to which the rearview mirror inlet tube 62 is attached, to blow air into the rearview mirror outer case 52. The system may also employ a window frame 30 and a vehicle door body 53 such that the air distributor 71 is located between the window frame 30, or slanted portion 32 of the frame 30, and the vehicle door body 53. An electric motor 40 may lie within the rearview mirror outer case 52 to move the mirror surface 38 to different positions.

With continued reference primarily to FIG. 5, a partition 54 in the cavity of the rearview mirror inner case 37 to route the forced air along a bottom surface of the outer case 52 and a bottom half of the mirror surface 38 and then along a top surface of the outer case 52 and a top half of the mirror, wherein the partition 54 lies longitudinally between the rearview mirror inlet tube 62 and the rearview mirror outlet tube 64. A membrane 44 may be located between the mirror surface 38, or end or edge of the mirror, and the rearview mirror outer case 52 to prevent debris from entering the mirror outer case 52.

In yet another presentation of the present disclosure, a heating system for a vehicle 10 may employ a vehicle rearview mirror outer case 52 defining a cavity within which a mirror 38 resides. A vehicle rearview mirror inner case 37 may also define a cavity, such as a hollow portion to permit air to flow in and out of the cavity. The rearview mirror inner case 37 may partially or completely reside within the rearview mirror outer case 52. A mirror surface 38 may reside against the rearview mirror inner case 37 (see FIGS. 3, 4A and 4B for an example). A rearview mirror inlet tube 62 may pass through the outer case 52 and the inner case 37 and permit warmed air to enter the rearview mirror inner case 37. The warmed air may be warm enough to prevent or expel moisture from the mirror surface 38. A rearview mirror outlet tube 64 may pass through the outer case 52 and the inner case 37 and permit air to exit the rearview mirror inner case 37. An interior surface 74 of a vehicle door window 70 may receive warmed blown air from an outlet 72 of an air distributor 71 located adjacent to the vehicle door window 70. The air distributor 71 may be located between the window frame 30, or a slanted portion 32 of material that forms part of the window frame 30 and connects to or contacts the door body 53, and the vehicle door body 53.

Continuing with reference to FIGS. 1 and 5, an HVAC unit 12 may be attached to the rearview mirror inlet tube 62 to blow air into the rearview mirror outer case 52. A partition 78, 54 in the cavity of the rearview mirror inner case 37 may route forced air 60 from the inlet tube 62 along a surface, including a rear surface 86 (FIG. 4B) of the mirror 38 such that the partition 78 lies longitudinally between the rearview mirror inlet tube 62 and the rearview mirror outlet tube 64.

The embodiments and teachings presented above have been discussed with reference to either a driver side rear view mirror and associated window or a passenger side rear view mirror and associated window. The teachings are applicable to both a driver side rear view mirror and a passenger side rear view mirror, and the associated windows of each.

There are multiple advantages in using the structure of the present disclosure. The teachings provide a method to heat the driver side rear view mirror and the passenger side rear view mirror to prevent frost, ice and any accumulation of moisture from the viewable surface of the mirror. The forced air 60 circulates from the HVAC unit 12 to the mirrors and then is blown on the interior surface of the side window glass to prevent fogging and moisture from building upon the interior surface of the window glass. Another advantage is that electrical heaters, which consume electrical energy, may be eliminated from the vehicle. Still yet, one source of heat, that being the HVAC unit 12, may be used to heat the side mirrors and the front side window surface. The heat output of the HVAC unit 12 may be adjusted to account for the amount of frost or condensation buildup on the mirror surfaces 38, the inside window surfaces 74, and the outside window surfaces. The HVAC unit 12 may also be adjusted with the controls 24 to account for the temperature outside of the vehicle 10. Still yet, another advantage is that heated air directed through the mirror inlet tubes is recaptured and used on the interior window surface and may then be used to heat the interior cabin or circulated back into the HVAC unit 12 if the HVAC unit is equipped with a recirculation function. The recirculation feature of HVAC units 12 is known in the art.

When an element or layer is referred to as being "on", "engaged to", "connected to" or "coupled to" another element or layer, it may be directly on, engaged, connected or coupled to the other element or layer, or intervening elements or layers may be present. In contrast, when an element is referred to as being "directly on," "directly engaged to", "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

The foregoing description of the embodiments has been provided for purposes of illustration and description. It is not intended to be exhaustive or to limit the invention. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the invention, and all such modifications are intended to be included within the scope of the invention.

What is claimed is:

1. A heating system for a vehicle comprising:
    a vehicle rearview mirror outer case defining a cavity within which a mirror resides;
    a vehicle rearview mirror inner case defining a cavity, the rearview mirror inner case residing within the rearview mirror outer case;
    a mirror surface residing against the rearview mirror inner case;
    a membrane located between the mirror surface and the rearview mirror outer case;
    a rearview mirror inlet tube that passes through the outer case and the inner case and permits air to enter the rearview mirror inner case; and
    a rearview mirror outlet tube that passes through the outer case and the inner case and permits the air to exit the rearview mirror inner case.

2. The heating system of claim 1, further comprising:
    an HVAC unit, to which the rearview mirror inlet tube is attached, to blow the air into the rearview mirror outer case.

3. The heating system of claim 2, further comprising:
an electric motor within the rearview mirror outer case to move the mirror surface to different positions.

4. The heating system of claim 3, further comprising:
a partition in the cavity of the rearview mirror inner case to route the forced air along a rear surface of the mirror surface, the partition being parallel to the mirror surface and protruding from one end only of the rearview mirror inner case.

5. The heating system of claim 4, wherein the partition lies longitudinally between the rearview mirror inlet tube and the rearview mirror outlet tube.

6. The heating system of claim 1, further comprising:
a vehicle door that defines an air distributor; and
a vehicle door window, wherein the air distributor distributes the air across an interior surface of the door window.

7. The heating system of claim 6, wherein the rearview mirror outlet tube passes into the air distributor.

8. A heating system for a vehicle comprising:
a vehicle rearview mirror outer case defining a cavity within which a mirror resides;
a vehicle rearview mirror inner case defining a cavity, the rearview mirror inner case residing within the rearview mirror outer case;
a mirror surface residing against the rearview mirror inner case;
a rearview mirror inlet tube that passes through the outer case and the inner case and permits air to enter the rearview mirror inner case;
a rearview mirror outlet tube that passes through the outer case and the inner case and permits the air to exit the rearview mirror inner case;
a vehicle door window; and
a vehicle door that defines an air distributor to distribute the air from the rearview mirror outlet tube across an interior surface of the vehicle door window.

9. The heating system of claim 8, further comprising:
an HVAC unit, to which the rearview mirror inlet tube is attached, to blow the air into the rearview mirror outer case; and
a window frame; and
a vehicle door body, wherein the air distributor is located between the window frame and the vehicle door body.

10. The heating system of claim 9, further comprising:
an electric motor within the rearview mirror outer case to move the mirror surface to different positions.

11. The heating system of claim 10, further comprising:
a partition in the cavity of the rearview mirror inner case to route the forced air along a bottom surface of the outer case and a bottom half of the mirror surface and then along a top surface of the outer case and a top half of the mirror, wherein the partition lies longitudinally between the rearview mirror inlet tube and the rearview mirror outlet tube.

12. The heating system of claim 11, further comprising:
a membrane located between the mirror surface and the rearview mirror outer case to prevent debris from entering the mirror outer case.

13. A heating system for a vehicle comprising:
a vehicle rearview mirror outer case defining a cavity within which a mirror resides;
a vehicle rearview mirror inner case defining a cavity, the rearview mirror inner case residing within the rearview mirror outer case;
a mirror surface residing against the rearview mirror inner case;
a flexible membrane located between the mirror surface and the rearview mirror outer case to prevent debris from entering the mirror outer case;
a rearview mirror inlet tube that passes through the outer case and the inner case and permits air to enter the rearview mirror inner case;
a rearview mirror outlet tube that passes through the outer case and the inner case and permits the air to exit the rearview mirror inner case;
a vehicle door window;
an air distributor to distribute the air from the rearview mirror outlet tube to an interior surface of the door window;
an HVAC unit, to which the rearview mirror inlet tube is attached, to blow the air into the rearview mirror outer case;
a vehicle door window frame;
a vehicle door body, wherein the air distributor is located between the window frame and the vehicle door body; and
a partition in the cavity of the rearview mirror inner case to route the forced air along a surface of the mirror, wherein the partition lies longitudinally between the rearview mirror inlet tube and the rearview mirror outlet tube.

14. The heating system of claim 13, further comprising:
an electric motor within the rearview mirror outer case to move the mirror surface to different positions.

15. The heating system of claim 13, wherein the air distributor is located adjacent the vehicle door window.

16. The heating system of claim 13, wherein the partition in the cavity of the rearview mirror inner case is cantilevered from the mirror inner case.

* * * * *